3,383,342
POLYESTER RESIN COATING COMPOSITIONS CONTAINING HEXAKIS (METHOXYMETHYL) MELAMINE
James R. Stephens, Gary, Ind., assignor to Standard Oil Company, Chicago, Ill., a corporation of Indiana
No Drawing. Continuation of application Ser. No. 225,867, Sept. 24, 1962. This application Dec. 9, 1966, Ser. No. 600,658
6 Claims. (Cl. 260—21)

ABSTRACT OF THE DISCLOSURE

Liquid thermosetting coating compositions consisting essentially of a physical mixture of (I) about 50–90 weight percent of a reaction product, having an acid number of about 10–100, of a polycarboxylic acid having at least 2 carboxyl groups and a triglyceride having at least 3 hydroxyl groups; and (II) about 10–50 weight percent of a monomeric triazine having at least 4 alkoxymethyl groups.

---

This is a continuation of application Ser. No. 225,867, filed Sept. 24, 1962, now abandoned.

This invention relates to baking resins having thermosetting properties and suitable for the formation of protective surface coatings, and more particularly to liquid resin compositions which have a high solids content and are suitable for application on a surface by conventional methods without the need for an inert solvent.

The solids content of a liquid resin composition is descriptive of that portion which solidifies into or forms a solid protective film upon baking. Since conventional methods of preparing protective coatings require the resin compositions to be liquid, the remaining portion is largely made up of an inert solvent which vaporizes during the baking process and therefore does not become part of the solid protective film. These inert solvents commonly include expensive hydrocarbon solvents such as xylene, oxygenated hydrocarbon solvents such as isopropyl alcohol, and water; and add significantly to the cost of preparing and transporting the resin compositions.

It has been discovered that a liquid resin composition results from the physical mixture of (1) a condensation reaction product of (a) a polycarboxylic acid having at least 2 carboxyl groups and a hydrocarbon residue and (b) a triglyceride having at least 3 hydroxyl groups, and (2) a monomeric triazine having at least 4 alkoxy methyl groups. The resulting composition is liquid and therefore suitable for application on a surface without the need for the usual inert solvents. It has also been discoverd that the liquid resin when baked at temperatures in the order of 300–400° F. produces protective surface coatings which exhibit very desirable properties.

The composition or liquid resin of the invention consists essentially of a physical mixture of (1) a condensation reaction product of (a) a polycarboxylic acid having at least 2 carboxyl groups and a hydrocarbon residue and (b) a triglyceride having at least 3 hydroxyl groups, and (2) a monomeric triazine having at least 4 alkoxymethyl groups. The result is a liquid resin which is suitable for the formation of baked surface coatings at temperatures in the order of 300–400° F.

REACTION PRODUCT

The condensation reaction product results from the condensation of a polycarboxylic acid having at least 2 carboxyl groups and a hydrocarbon residue, and a triglyceride having at least 3 carboxyl groups. The acid includes aliphatic and aromatic polycarboxylic acids, preferably aromatic polycarboxylic acids, and especially benzene polycarboxylic acids. The number of acidic groups may range as high as 6, although those having from 2–4 carboxyl groups are preferred and especially those having from 2–3 carboxyl groups since they are readily available and produce highly desirable results. A benzene polycarboxylic acid (having a phenyl residue and) having from 2 to about 4 carboxy groups and especially from 2 to 3 carboxy groups is particularly preferred since it imparts highly desirable properties such as hardness to the baked coating in addition to its being readily available. It is to be understood that the above description of the polycarboxylic acid includes anhydrides and that an anhydride group is equivalent to 2 carboxyl groups. Examples of suitable acids include phthalic anhydride, phthalic acid, isophthalic acid, terephthalic acid, benzophenone dicarboxylic acid and the like; trimellitic anhydride, trimellitic acid, hemimellitic anhydride, hemimellitic acid, trimesic acid and the like, pyromellitic dianhydride, pyromellitic acid, benzophenone tetracarboxylic acid and the like; benzene pentacarboxylic acid, benzene hexacarboxylic acid and the like; with phthalic anhydride, phthalic acid, trimellitic anhydride, trimellitic acid and trimesic acid being preferred.

The condensation reaction product results from the above defined polycarboxylic acid and a triglyceride having at least 3 hydroxyl groups, preferably a triglyceride having only 3 hydroxyl groups, and especially a castor oil triglyceride. The important acidic moiety in castor oil is that of ricinoleic acid (a monohydroxy acid) which provides the 3 hydroxy groups in the triglyceride. It is particularly desirable to employ castor oil directly as a reactant in preparing the condensation reaction product, since it is readily available, relatively inexpensive, and imparts many desirable properties to the defined liquid resin.

The defined condensation reaction product is prepared by condensing the defined polycarboxylic acid with the defined triglyceride having at least 3 hydroxyl groups at elevated temperatures (about 300–400° F.) while continuously removing the water formed in the reaction. The condensation reaction is well known and it is not necessary to describe it in detail herein.

The characteristics of the condensation reaction product are dependent upon the type of reactants, and upon the mole ratios existing among the reactants. In general, the mole ratio of the defined polycarboxylic acid to the defined triglyceride (having hydroxyl groups) is from about 1:1 to 1:3 and preferably from 2:3 to 2:5, especially with aromatic polycarboxylic acids having from 2 to 4 carboxyl groups and particularly those having from 2 to 3 carboxyl groups, since these ratios provide a desirable balance between the viscosity of the resultant reaction product and such properties as hardness and flexibility in the baked surface coating.

It is essential that the condensation reaction product have a definite acid titer i.e. have an acid number greater than 0 to 5. It is desirable that the condensation reaction product have an acid number between about 10 to 100 and especially about 35 to 100 since a product with this property imparts many desirable physical properties to the ultimate baked resin coating and in addition serves as a catalyst and coreactant in the desired reaction between the defined product and the hereinafter defined triazine during the baking of the resin coating.

TRIAZINE

A triazine is also present in the liquid resin of this invention and serves as a reactant solvent. The triazine has the general formula:

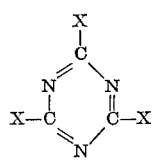

where at least two of the X's are bis-alkoxymethyl amino [$(ROCH_2)_2N$] substituents and the remaining X is a cyclic or aliphatic hydrocarbon group and preferably an aromatic group such as a phenyl group, or the remaining X is another bis-alkoxymethyl amino group. The alkoxy group has from 1 to about 4 carbon atoms and preferably about 1 carbon atom. Suitable triazines having four alkoxymethyl groups include tetrakis(alkoxymethyl) benzoquanamines and tetrakis(alkoxymethyl) acetoquanamines, and the like. These compounds may also be named in other ways as illustrated by N,N,N'N'-tetrakis (alkoxymethyl)-2,6 - diamino - 4 - phenyl - s-triazine for tetrakis(alkoxymethyl)benzoquanamine.

Examples of triazines having six alkoxymethyl groups are hexakis(alkoxymethyl) melamine also known as N,N,N',N',N",N" - hexakis(alkoxymethyl) - 2,4,6-triamino - s - triazine. It is understood that the alkoxy groups may contain from 1 to about 4 carbon atoms and preferably about 1 carbon atom and that the triazines include those having alkoxy groups containing different numbers of carbon atoms (such as methyl, ethyl, propyl and butyl). Preferred triazines are those having methoxymethyl groups and especially tetrakis(methoxymethyl) benzoquanamine and hexakis(methoxymethyl)melamine. Although commercial triazines are generally suitable, it is preferred that they have a high degree of purity such as 98% and above.

The defined liquid resin results from a physical mixture of the defined condensation reaction product and the defined triazine. Generally, the triazine is present in an amount ranging from about 10 to about 50 weight percent of the physical mixture although percentages outside this range may be used.

The physical mixture generally is prepared by the simple addition of the defined triazine to the defined condensation reaction product. When a normally solid triazine such as hexakis(methoxymethyl) melamine is utilized it is desirable to melt the solid triazine and then add the melted triazine to the defined reaction product.

The liquid resins of this invention are very suitable for the formation of protective coatings. Hard surface coatings are formed when the liquid resin is baked at temperatures in the order of 300–400° F. for times ranging from 15 minutes to an hour. Surprisingly, in addition to their hardness these coatings also exhibit a highly desirable flexibility, that is, they are tough.

In addition, pigmented formulations may be prepared from the liquid resin by adding such commercial pigments as titanium dioxide to the liquid resin. A typical and preferred pigment to binder (liquid resin) ratio is 0.9:1.

In general, the liquid resin and pigmented formulations are very suitable for application by roller bar, brush or spray gun. However, where a very low viscosity is required as in certain spraying operations a small amount of a solvent such as methyl alcohol may be added. Generally, amounts in the order of 5% by weight are sufficient.

The following examples illustrate some embodiments of this invention. It is to be understood that these are for illustrative purposes only and do not purport to be wholly definitive with respect to conditions or scope.

Example I

A polyester composition was prepared by heating a mixture of 813 g. of castor oil and 96 g. of trimellitic anhydride (approximate mole ratio 2:1) at approximately 300° F. while stirring and sparging with nitrogen until the acid number of the resin was about 50. Water of reaction was withdrawn overhead. The time required to produce this viscous liquid polyester composition was approximately nine hours.

Four clear enamel formulations were prepared by stirring melted hexakis(methoxymethyl) melamine (98% purity) (abbreviated as HM) into the liquid polyester to give four clear solutions containing 20, 30 40 and 50 wt. percent of the melamine and having viscosities ranging from T to V on the Gardner Scale. These formulations (or liquid resins) remained stable for more than six months.

Coatings of the clear enamel formulations were prepared on Bonderite-100 metal panels. Since no solvent was required in this system, the usual flash-off was not required and the panels were baked immediately at 300° F. and 400° F. Smooth films were formed in all cases. The coatings were tested for resistance to impact without cracking and flexibility by a standard bend test over a ⅛" mandrel.

TABLE I

| Coating | Enamel | Viscosity | 30 min. Bake Temperature, °F. | Weight percent of HM | Thickness in Mils | Impact in Inch Lbs. | Flexibility |
|---|---|---|---|---|---|---|---|
| 1 | A | V | 300 | 20 | 1.9 | >80 | P |
| 2 | B | T | 300 | 30 | 2.0 | >80 | P |
| 3 | C | T | 300 | 40 | 1.8 | >80 | P |
| 4 | D | R | 300 | 50 | 1.4 | >80 | P |
| 5 | A | V | 400 | 20 | 2.0 | >80 | P |
| 6 | B | T | 400 | 30 | 2.0 | >80 | P |
| 7 | C | T | 400 | 40 | 1.6 | 14 | P-F |
| 8 | D | R | 400 | 50 | 1.4 | 6 | F |

The above results in Table I demonstrate that liquid resins were prepared by physically mixing the condensation product of 813 g. of castor oil and 96 g. of trimellitic anhydride (approximate mole ratio of 2:1), and from 20 to 50 (20, 30, 40 and 50) weight percent of hexakis(methoxymethyl) melamine. The results also demonstrate that these liquid resins were very suitable for the formation of baked surface coatings as indicated by coatings 1–6 which exhibited excellent impact resistance (over 80 in. lbs.) and flexibility (passed ⅛" bend test).

Example II

A polyester composition was prepared from the mixture of 542 g. of castor oil and 96 g. of trimellitic anhydride (approximate mole ratio 4:3) in a similar manner to the preparation of polyester composition of Example I. The result after approximately 3½ hours was a viscous liquid having an acid number of approximately 91.

Four clear enamel formulations were prepared from the polyester composition in a similar manner to the preparation of the enamel formulations of Example I. The hexakis(methoxymethyl) melamine content of the formulations was 20, 30, 40 and 50 weight percent and the viscosity of the formulations ranged from T to Z on the Gardner Scale. These formulations were also stable for over six months.

Coatings of the enamel formulations were applied to Bonderite-100 metal panels and were baked at 300° F. and 400° F. Smooth films were formed in all cases. The results are listed in Table II below:

TABLE II

| Coating | Enamel | Viscosity | 30 min. Bake Temperature, °F. | Weight percent of HM | Thickness in Mils | Impact in Inch Lbs. | Flexibility |
|---|---|---|---|---|---|---|---|
| 1 | A | Z | 300 | 20 | 2.0 | 80 | P |
| 2 | B | T | 300 | 30 | 1.8 | 80 | P |
| 3 | C | Z | 300 | 40 | 1.5 | 80 | P |
| 4 | D | X | 300 | 50 | 1.3 | 80 | P |
| 5 | A | Z | 400 | 20 | 1.7 | 80 | P |
| 6 | B | T | 400 | 30 | 1.7 | 2 | F |
| 7 | C | Z | 400 | 40 | 1.6 | 2 | F |
| 8 | D | X | 400 | 50 | 1.5 | 2 | F |

The results in Table II demonstrate that liquid resins resulted when the mole ratio of castor oil to trimellitic anhydride for the condensation product was changed from approximately 2:1 in Example I to 4:3 in Example II. The results also demonstrate that these liquid resins were very suitable for the formation of baked surface coatings as indicated by coatings 1–5 which exhibited excellent impact resistance (over 80 in. lbs.) and flexibility (passed ⅛″ bend test).

Example III

A polyester composition was prepared from the mixture of 542 g. of castor oil and 74 g. of phthalic anhydride (approximate mole ratio 4:3) in a similar manner to the preparation of the polyester of Example I. The result after approximately 2 hours was a viscous liquid resin having an acid number of about 50.

Two clear enamel formulations were prepared from the polyester composition in a similar manner to the preparation of the enamel formulations of Example I. The hexakis(methoxymethyl) melamine content of the formulation was 20 and 30 weight percent. These formulations were stable for over six months.

A pigmented enamel formulation having 30% (weight) of hexakis (methoxymethyl) melamine (HM) was also prepared by stirring 42.9 g. of HM into 100 g. of the polyester. The enamel was pigmented in a ball mill at a pigment to a binder ratio of 0.9:1 by grinding 50 g. of the formulation overnight with 45 g. of Rutile TiO₂. The pigmentation went smoothly and the finished enamel having a grind value of 7+ on the Hegeman Scale could be readily applied by roller or draw bar to panels. However, for spray application, methanol to the extent of 4.8% of the total weight of enamel formulation (pigment plus clear enamel) was added to give a better spray.

Coatings of the clear enamel formulations and the pigmented enamel formulation were applied on Bonderite 100 metal panels. The results are listed in Table III below:

TABLE III

| Coating | Enamel | Viscosity | 30 min. Bake Temperature, °F. | Weight percent of HM | Thickness in Mils | Impact in Inch Lbs. | Flexibility |
|---|---|---|---|---|---|---|---|
| 1 | A | W | 300 | 20 | 1.7 | 80 | P |
| 2 | B | T | 300 | 30 | 1.5 | 80 | P |
| 3 | A | W | 400 | 20 | 1.1 | 80 | P |
| 4 | B | T | 400 | 30 | 1.0 | 80 | P |
| 5 | (¹) | | 300 | 30 | 1.5 | 80 | P |
| 6 | (¹) | | 350 | 30 | 1.6 | 50 | P |
| 7 | (¹) | | 400 | 30 | 1.9 | 2 | F |

¹ Pigmented enamel.

The above results in Table III demonstrates that liquid resins were prepared by physically mixing the condensation product of 542 g. of castor oil and 74 g. of phthalic anhydride (approximate mole ratio of 4:3), and 30 weight percent of hexakis(methoxymethyl) melamine. This resin as a clear enamel and as a pigmented enamel produced very suitable baked surface coatings as indicated by coatings 1–4 and coating 5, respectively, which exhibited excellent impact resistance (80 in. lbs.) and flexibility (passed ⅛″ bend test).

Thus having described the invention, what is claimed is:

1. A liquid thermosetting coating composition consisting essentially of a physical mixture of (I) about 50–90 weight percent of a reaction product of (a) a benzene polycarboxylic acid having from 2 to 4 carboxyl groups or anhydride thereof, and (b) about 1–3 moles of castor oil per mole of said acid; said reaction product having an acid number of about 10–100; and (II) about 10–50 weight percent of hexakis(methoxymethyl)melamine.

2. The composition of claim 1 wherein said acid is trimellitic anhydride.

3. The composition of claim 2 wherein the amount of (b) is about 2 moles, and the acid number of the reaction product is about 50.

4. The composition of claim 2 wherein the amount of (b) is about 1.3 moles, and the acid number of the reaction product is about 91.

5. The composition of claim 1 wherein said acid is phthalic anhydride.

6. The composition of claim 5 wherein the amount of (b) is about 1.3 moles, and the acid number of the reaction product is about 50.

(References on following page)

References Cited

UNITED STATES PATENTS

| | | | |
|---|---|---|---|
| 3,098,051 | 7/1963 | Matt | 260—404.8 |
| 3,158,584 | 11/1964 | Layman | 260—22 |
| 3,207,715 | 9/1965 | Stephens | 260—22 |
| 2,510,503 | 6/1950 | Krope | 260—876 |
| 3,017,381 | 1/1962 | Schlegel | 260—868 |
| 3,098,151 | 7/1963 | Matt | 260—404.8 |
| 2,048,778 | 7/1936 | Brubaker | 260—22 |
| 2,276,243 | 3/1942 | West | 260—75 |
| 3,047,531 | 7/1962 | D'Alelio | 260—875 |

FOREIGN PATENTS

| | | |
|---|---|---|
| 880,403 | 10/1961 | Great Britain. |
| 487,681 | 6/1938 | Great Britain. |

OTHER REFERENCES

Chemical and Engineering News, May 21, 1962, page 19 TP1I418.

DONALD E. CZAJA, *Primary Examiner.*

J. A. SEIDLECK, *Examiner.*

L. J. BERCOVITZ, R. W. GRIFFIN,
*Assistant Examiners.*